United States Patent [19]

Pifer et al.

[11] Patent Number: 4,914,444
[45] Date of Patent: Apr. 3, 1990

[54] SYSTEM AND METHOD FOR SYNCHRONIZING LIGHTNING DETECTORS

[75] Inventors: Alburt E. Pifer; Dion W. Howard, both of Tucson, Ariz.

[73] Assignee: Lightning Location and Protection, Inc., Tucson, Ariz.

[21] Appl. No.: 84,377

[22] Filed: Aug. 11, 1987

[51] Int. Cl.⁴ .............................................. G01S 3/18
[52] U.S. Cl. .................................... 342/460; 342/26; 342/465
[58] Field of Search ................ 342/460, 463, 465, 26, 342/59

[56] References Cited

U.S. PATENT DOCUMENTS

| | | |
|---|---|---|
| 2,402,688 | 6/1946 | Skurnick ............... 342/460 |
| 2,637,841 | 5/1953 | Davis et al. ............ 342/460 |
| 2,684,474 | 7/1954 | Kass ...................... 342/26 |
| 2,864,081 | 12/1956 | Steelman ............... 342/460 |
| 3,727,225 | 4/1973 | Adrian .................. 342/460 |
| 3,754,263 | 8/1973 | Wojtasinski et al. ... 342/460 |
| 3,886,553 | 5/1975 | Bates .................... 342/465 |
| 3,973,258 | 8/1976 | Cerni et al. ............ 342/26 |
| 4,000,466 | 12/1976 | Scouten et al. ........ 342/460 X |
| 4,138,660 | 2/1979 | Hill ....................... 342/460 |
| 4,543,580 | 9/1985 | Bent et al. ............. 342/460 |
| 4,792,806 | 12/1988 | Bent et al. ............. 342/465 |

Primary Examiner—Thomas H. Tarcza
Assistant Examiner—John B. Sotomayor
Attorney, Agent, or Firm—Mason, Kolehmainen, Rathburn & Wyss

[57] ABSTRACT

A synchronization system and method for a lightning location system having a plurality of remote lightning detectors transmitting data to a lightning position analyzer via a communication system having variable transmission delays. Each lightning detector includes a clock for identifying the time of occurrence of a lightning event such as cloud to ground lightning discharge, the time of occurrence data being transmitted to the position analyzer along with other data representing the lightning event. The position analyzer also includes a clock for identifying the time of arrival at the analyzer of data representing a lightning event. Lightning events are correlated by the position analyzer by comparing the time intervals between the occurrence of lightning events detected by one detector and the time intervals between the occurrence of lightning events detected by a second detector. The dfference between the time of occurrence of a lightning event detected by the one detector and the time of occurrence of a correlated lightning event detected by the second detector is used as a correction factor to synchronize the two detectors. Synchronized detectors are synched to the position analyzer clock by using the minimum difference between the time of arrival of data representing a lightning event and the time of occurrence of the lightning event detected by a synchronized detector.

25 Claims, 3 Drawing Sheets

SYSTEM AND METHOD FOR SYNCHRONIZING LIGHTNING DETECTORS

TECHNICAL FIELD

The present invention relates to a lightning location system having a number of remotely located lightning detectors for detecting predetermined lightning events and more particularly to a system and method for synchronizing the lightning detectors of such a lightning location system by correlating detected lightning events based on the time interval between the occurrence of the events.

BACKGROUND OF THE INVENTION

Lightning location systems are known which include a number of cloud to ground lightning detectors separated by distances of tens to hundreds of miles. One known lightning detector provides azimuth and field amplitude information for each detected lightning discharge as well as the time of occurrence of the discharge as measured by the detector's clock. This data is sent from each of the detectors which have observed a lightning discharge to a central site or office where the location of the cloud to ground lightning discharge is determined. In order to calculate the location of a lightning discharge the data for a discharge observed by one detector must be correlated with the data for the same discharge observed by another detector. The clocks employed in known detectors typically drift and are not precise enough to enable the central office to correlate lightning data simply by matching the time of occurrence of a discharge as measured by one detector with the time of occurrence of a discharge as measured by a second detector. Clocks, such as atomic clocks having long term drifts of less than 1 millisecond would provide timing data with sufficient accuracy to correlate lightning based on time of occurrence alone. However these clocks are too expensive and impractical for the environments in which known lightning detectors operate.

In order to correlate lightning discharge data from two or more detectors, known lightning location systems have used dedicated communication lines for the transmission of data from each of the detectors to the central site, wherein the transmission delays for such lines are fixed and known. The central site of such known systems correlates the lightning discharge data based on the time of arrival of the data at the central site with a correction factor based on the transmission delay associated with the detector's communication line. A major disadvantage of such systems is the extremely high cost of the dedicated communication lines.

SUMMARY OF THE INVENTION

In accordance with the present invention, the disadvantages of prior lightning location systems have been overcome. The system and method of the present invention correlates lightning events detected by two or more lightning detectors using the lightning itself as an external reference for synchronization. The system and method may be used to synchronize a lightning location system or any network of remote automatic weather stations utilizing lightning detectors.

The system and method of the present invention employs a plurality of lightning detectors which detect the occurrence of a predetermined lightning event and transmit data to a central site or office using a communication system having variable transmission delays. Each detector includes a clock for identifying the time of occurrence of a detected lightning event, the time of occurrence data being transmitted to the central site with other data used to determine the location of the lightning event. The central site correlates lightning events observed by two detectors based on the time interval between plural lightning events observed by the detectors. A time correction factor is determined from the difference between the time of occurrence measured by one detector for a given lightning event and the time of occurrence measured by a second detector for a correlated lightning event, the time correction factor being applied to synchronize the clocks of the two detectors.

In one embodiment, lightning events detected by two detectors are correlated by comparing the time intervals between lightning events detected by one detector with the time intervals between lightning events detected by a second detector. If the time intervals are approximately equal, the difference, $\Delta t$, between the times of occurrence as measured by the first and second detector for the lightning events associated with the time interval, is calculated and stored. The value of $\Delta t$ occurring most frequently for lightning events detected by the first and second detectors forms the time correction factor used to synchronize the two detectors.

In the second embodiment, lightning events detected by two detectors are correlated by first assuming that the data from one detector arriving at the central site within a predetermined period of time of data from a second detector is associated with the same lightning event as the data from the second detector. The difference between the times of occurrence as measured by the first and second detectors for the lightning event is calculated and used to correct the time of occurrence data for each lightning event detected by the second detector. The times of occurrence for each lightning event detected by the first and second detectors are compared and the times which agree are counted. These steps are repeated for each pair of lightning events detected by the first and second detectors whose data arrives at the central site within the predetermined period of time of each other. The value of $\Delta t$ associated with the highest count of agreeing times of occurrence is then used as the correction factor to synchronize the detectors.

When lightning occurs at a very low rate such that the time between lightning events detected by two detectors is on the order of hours or days, the system and method of the present invention may further use a single lightning event detected by the two detectors to synchronize the detectors.

The system and method of the present invention further synchronizes the synched detectors to a clock at the central site so that the time of occurrence of each detected lightning event may be provided in absolute time. This synchronization is accomplished by setting a correction factor equal to the minimum detected transmission delay.

The system and method of synchronizing according to the present invention provides for synchronization on the millisecond level. However, the components of the system may further be synched down to the microsecond level by using the location information from the detector to calculate the propagation delay and then by compensating for the delay.

The system and method of the present invention is not only cost effective but also allows the lightning location system to employ cheaper forms of communication than has heretofore been possible. These and other objects and advantages of the invention, as well as details of an illustrative embodiment, will be more fully understood from the following description and from the drawings.

BEST MODE FOR CARRYING OUT THE INVENTION

The lightning location system of the present invention includes a plurality of remotely located lightning detectors or direction finders such as detectors 10-13 each of which is in communication with a central office 14. Each of the detectors 10-13 detects the magnetic and/or electric fields produced by lightning discharges and provides information defining the azimuth of the discharge and the amplitude of the received field to the central office 14 for further analysis. Each of the detectors 10-13 further includes a clock for identifying the time of occurrence of a detected lightning discharge, the time of occurrence information also being transmitted to the central office 14. Examples of lightning detectors suitable for use as the detectors 10-13 are disclosed in U.S. Pat. No. 4,115,732 and U.S. Pat. No. 4,198,599, incorporated herein by reference.

The central office 14 includes a position analyzer 16 for receiving the azimuth, amplitude and time data from each lightning detector. The position analyzer 16 includes a microprocessor 18 for storing and analyzing the data and further includes a clock for identifying the time of arrival of the data at the central office. An example of a suitable position analyzer is disclosed in U.S. Pat. No. 4,245,190, incorporated herein by reference. In order to determine the location of a lightning discharge, the position analyzer 16 needs data representing the discharge from at least two lightning detectors. The position analyzer 16 of the present invention correlates data from two or more detectors and synchronizes the detectors as discussed in detail below utilizing the lightning discharge itself as an external time reference. Because the lightning itself is used as a time reference, the lightning location system of the present invention may utilize a communication system for transmitting data between the detectors 10-13 and the central office 14 which has variable transmission delays. Such a communication system may be a packet switch network or a satellite system both of which are considerably cheaper than dedicated communication lines having fixed transmission delays.

Figure 2:
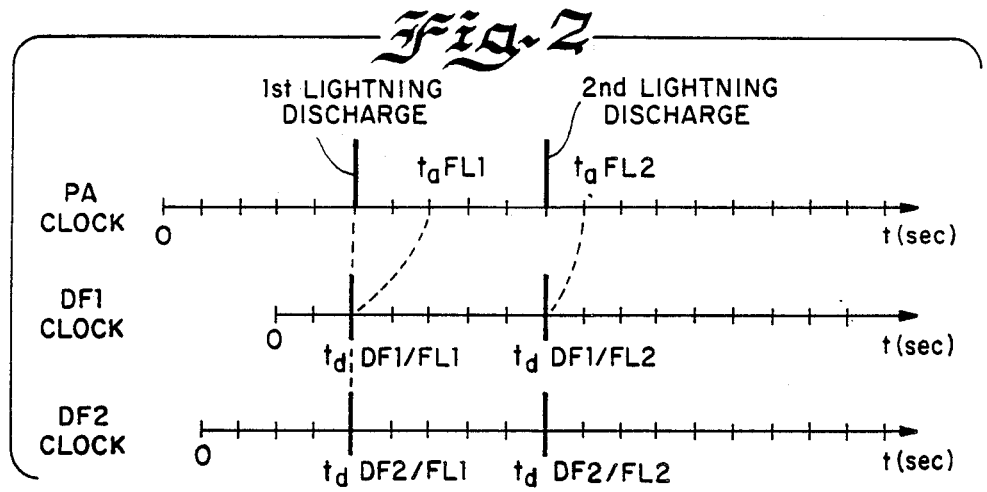
FIG. 2 is a time chart illustrating the variations in the clocks of lightning detectors and the position analyzer.

The system and method of the present invention is based upon the fact that although the clocks at each of the lightning detectors 10-13 might identify a different time of occurrence for a single detected lightning discharge if the clocks are out of synchronization, the time interval between a pair of lightning discharges detected by each of the detectors will be the same. For example, as shown in FIG. 2, for a first detector's clock, DF1, running two seconds behind a second detector's clock, DF2, the DF1 clock will identify the time of occurrence of a first lightning discharge at 2 seconds and the time of occurrence of a second lightning discharge at 7 seconds. The DF2 clock, however, will identify the time of occurrence of the first discharge at 4 seconds and the time of occurrence of the second discharge at 9 seconds. Although the times of occurrence measured by the two clocks are different, the time interval between the first and second discharges as measured by the DF1 clock will be 5 seconds which is the same time interval between the first and second discharges as measured by the DF2 clock. By matching the time intervals between lightning discharges as measured by the clocks from two or more direction finders as opposed to matching the time of occurrence of a lightning discharge as measured by the clocks, the position analyzer 16 is able to correlate lightning events detected by two or more detectors and can further synchronize and maintain in synchronism each of the detector's clocks.

Figure 1:
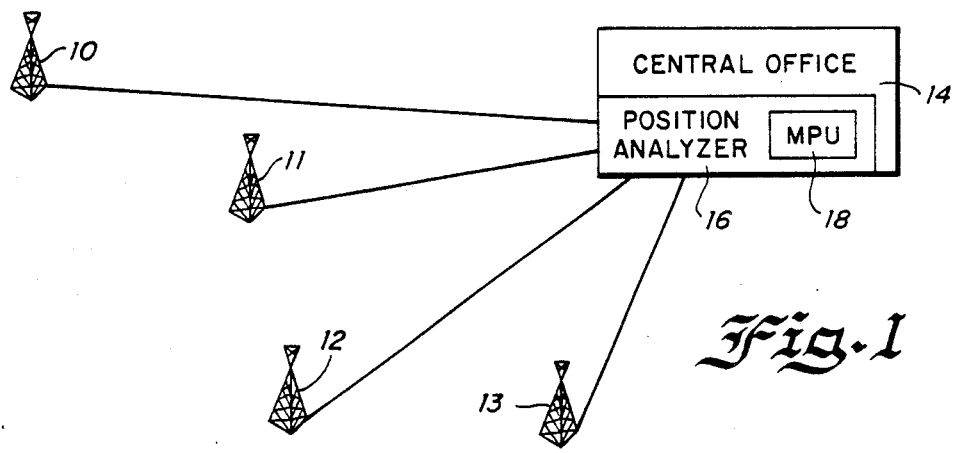
FIG. 1 is a diagram showing the general configuration of a system according to the present invention.
Figure 3:
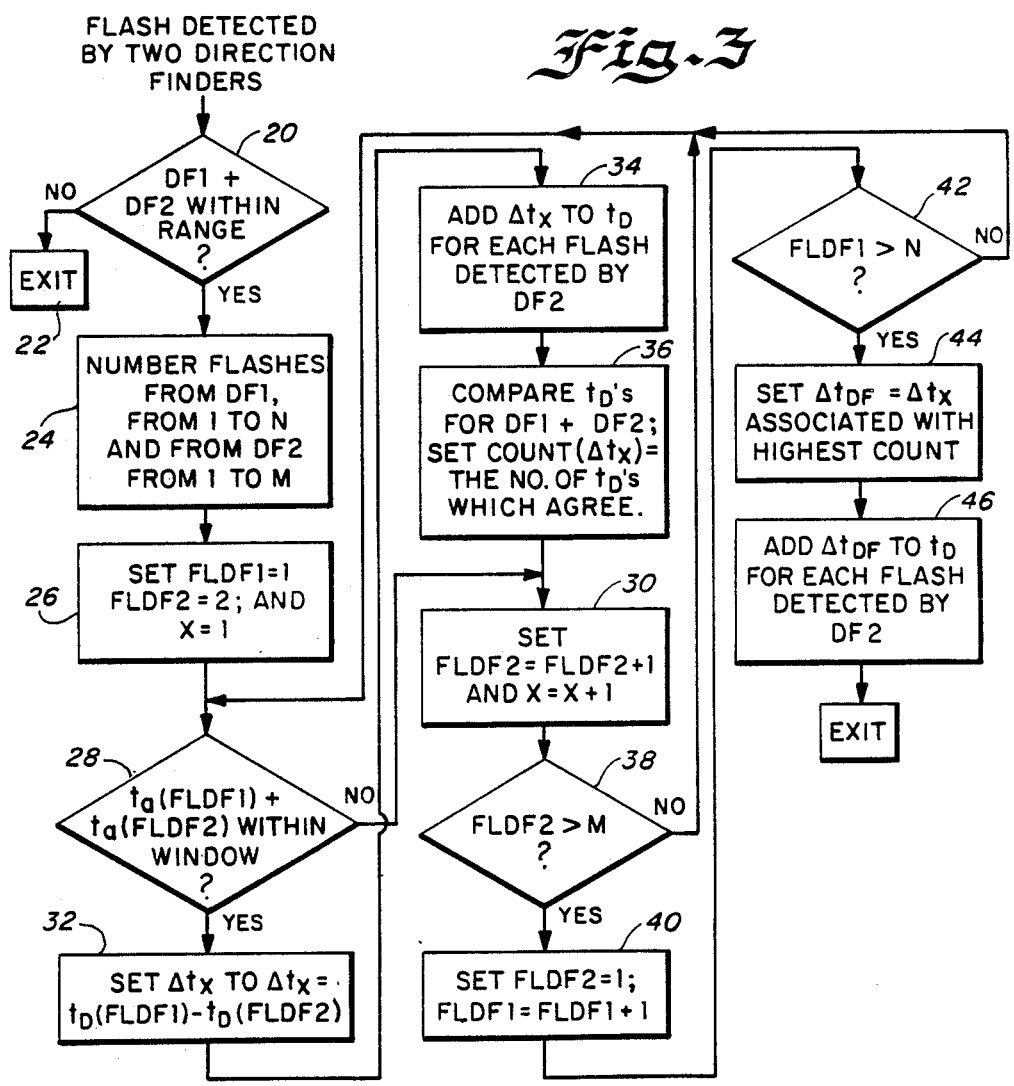
FIG. 3 is a flow chart illustrating one embodiment of the software for synchronizing two lightning detectors.

In one embodiment, the position analyzer 16 operates according to the flow chart illustrated in FIG. 3 to correlate lightning events detected by two lightning detectors and to synchronize their clocks. In general, according to this embodiment, the system operates to correlate lightning events by first assuming that the data from one detector arriving at the central site within a predetermined period of time of data from a second detector is associated with the same lightning event as the data from the second detector. The difference, $\Delta t$ between the times of occurrence as measured by the first and second detectors for the lightning event is calculated and used to correct the time of occurrence data for each lightning event detected by the second detector. The times of occurrence for each lightning event detected by the first and second detectors are compared and the times which agree are counted. These steps are repeated for each pair of lightning events detected by the first and second detectors whose data arrives at the central site within the predetermined period of time of each other. The value of $\Delta t$ associated with the highest count of agreeing times of occurrence is then used to synchronize the detectors.

More specifically, as shown in FIG. 3, when a predetermined lightning event such as a cloud to ground lightning flash is detected by two of the detectors 10-13, the microprocessor 18, at block 20 determines whether the two detectors, DF1 and DF2 are within range. If the detectors are not within range so that it is not possible or unlikely that a single lightning discharge could be detected by both of the detectors, the microprocessor 18 exits the synchronization routine at block 22. However, if the two detectors are within range, the microprocessor 18, at block 24, numbers the lightning events detected by the first lightning detector from 1 to N and numbers the lightning events detected by the second lightning detector from 1 to M. At block 26, the microprocessor 18 sets FLDF1=1, FLDF2=2, and X=1. Next, at block 28, the microprocessor 18 compares the time of arrival of the data for the first lightning event detected by the first detector, $t_a(FLDF1)$ to the time of arrival of the first lightning detected by the second detector, $t_a(FLDF2)$ to determine whether they are within a given window. This window is set to accommodate the maximum transmission delay so that if data for one lightning event arrives from one detector within that given period of time of data received at the position analyzer 16 from a second detector it is possible that the data corresponds to the same lightning event. If the time of arrivals are not within the window as determined by the microprocessor 18 at block 28, the processor proceeds to block 30 to increment the variable FLDF2 by one so that the time of arrival of the first lightning event detected by the first detector may be compared to the time of arrival of the second lightning event detected by the second detector and so on.

If the time of arrivals of data from the two detectors is within the window as determined by the processor 18 at block 28, the microprocessor at block 32 sets $\Delta t_x = t_D(FLDF1) - t_D(FLDF2)$ representing the difference between the time of occurrence of the first lightning event detected by the first detector and the time of occurrence of the first lightning event detected by the second detector. Thereafter, at block 34, the microprocessor 18 adds $\Delta t_x$ calculated at block 32 to $t_D$, the time of occurrence, for each lightning event detected by the second detector. At block 36, the microprocessor compares the time of occurrence for each lightning event identified by the first detector and the time of occurrence for each lightning event identified by the second detector as corrected at block 34 and sets a variable COUNT ($\Delta t_x$) equal to the number of times of occurrence which agree.

At block 30, the processor 18 increments the variable FLDF2 by one and increments the variable x by one. If the incremented value of FLDF2 is not greater than M, the processor returns to block 28. If the incremented value of FLDF2 is greater than M, at block 40, the microprocessor 18 sets FLDF2=1 and FLDF1=FLDF1+1 so that if the incremented value of FLDF1 is not greater than N as determined at block 42, the time of arrivals of the second lightning event detected by the first detector will be compared to the time of arrivals of each of the lightning events detected by the second detector, and so on. If FLDF1 is greater than N as determined at block 42, the data associated with each lightning event detected by the first detector has been compared to each lightning event detected by the second detector so that at block 44, the microprocessor sets $\Delta t_{DF}$ equal to the $\Delta t_x$ associated with the highest value of the variable COUNT. Thereafter, at block 46, the microprocessor 18 adds $\Delta t_{DF}$ to the time of occurrence, tD, for each flash detected by the second lightning detector to synchronize the second lightning detector to the first lightning detector.

Figure 4:
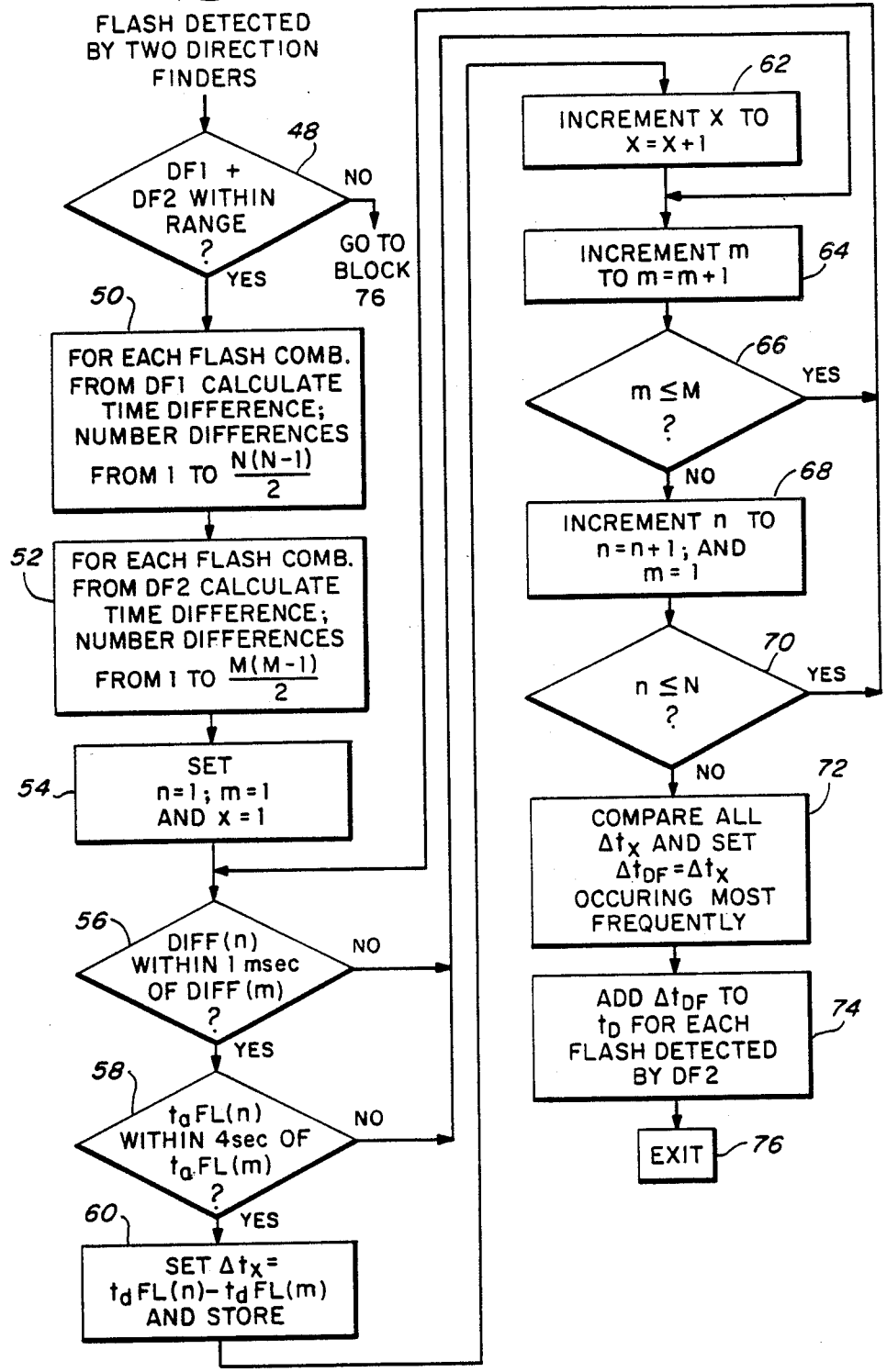
FIG. 4 is a flow chart illustrating a second embodiment of the software for synchronizing two lightning detectors.

A second and preferred embodiment of the software for correlating lightning events detected by two lightning detectors and for synchronizing the clocks of the two detectors is illustrated in FIG. 4. In general according to this embodiment, lightning events detected by two detectors are correlated by comparing the time intervals between lightning events detected by one detector with the time intervals between lightning events detected by a second detector. If the time intervals are approximately equal, the difference, $\Delta t$, between the times of occurrence as measured by the first and second detector for the lightning events associated with the time interval is calculated and stored. The value of $\Delta t$ occurring most frequently for lightning events detected by the first and second detectors form the time correction factor used to synchronize the two detectors.

More specifically, as shown in FIG. 4, when a lightning event is detected by two of the direction finders or detectors 10-13, the microprocessor 18 determines whether the detectors are within range and if not, the processor exits the routine at block 76. If the detectors are within range so that the same lightning event may be detected by each of them, the microprocessor proceeds to block 50. At block 50, the microprocessor 18 calculates the difference between the times of occurrence of each pair of flashes detected by the first detector and numbers the differences from 1 to $$\frac{N(n - 1)}{2},$$

there being $$\frac{N(N - 1)}{2}$$

different lightning event pairs for N detected lightning events. Similarly, at block 52 the microprocessor 18 calculates the difference between the times of occurrence of each pair of lightning events detected by the second detector and numbers the differences from 1 to $$\frac{M(M - 1)}{2}$$

where the second detector detects M lightning events. Thereafter, at block 54, the microprocessor 18 sets n=1; m=1 and x=1.

At block 56 the processor 18 determines whether the first time difference calculated for the first detector at block 50, DIFF (n), is within 1 millisecond of the first time difference calculated at block 52 for the second detector, DIFF (m). If not, the microprocessor proceeds to block 64 as discussed below. If the differences, that is the time interval between the first two lightning events detected by the first detector and the time interval between the first two lightning events detected by the second detector are within a time window, typically a few milliseconds of each other so that they are approximately equal, the processor 18 proceeds to block 58. It is noted that the time intervals may agree if they are within the time window of each other to account for the time that it takes for lightning to be seen by a detector.

At block 58, the processor compares the time of arrival of the nth lighting event observed by the first detector, $t_a$ FL(n), with the time of arrival of the mth lightning event detected by the second detector, $t_a$ FL(m), to determine whether they are within 4 seconds of each other to account for any transmission delay which might exist. If the time of arrivals are within 4 seconds of each other, the microprocessor at block 60 sets $\Delta t_x = t_D FL(n) - t_D FL(m)$; that is, the difference between the times of occurrence of the nth lightning event detected by the direct detector and the mth lightning event detected by the second lightning detector. The microprocessor at block 60 then stores this value of $\Delta t_x$.

At block 62, the microprocessor increments the variable x by one and at block 64 increments the variable m by one. At block 66, the microprocessor 18 determines whether m is less than or equal to M and if so, returns to block 56. If m is greater than M it is determined at block 66, the processor at block 68 increments n by one and sets m=1. Thereafter, the microprocessor 18 determines, at block 70 whether n is less than or equal to N and if it is returns again to block 56. If not, however, the processor at block 72 compares all of the $\Delta t_{x's}$ calculated and stored at block 60 and sets $\Delta t_{DF}$=the $\Delta t_x$ occurring most frequently. Thereafter, at block 74, the microprocessor 18 adds $\Delta t_{DF}$ to $t_D$, the time of occurrence, for each flash detected by the second detector to synchronize the first and second detectors.

The lightning event used by the synchronization routines described above with reference to FIG. 3 and FIG. 4 may be a flash wherein the time of occurrence of each flash is set equal to the time of occurrence of the first stroke occurring in the flash, the first stroke having an identifiable field pattern which is different from the remaining strokes associated with a flash. However, the lightning event may also be a stroke so that the time interval between lightning events is the time interval between the time of occurrence of one stroke of a flash and the time of occurrence of another stroke of that same flash. Further, although each of the synchronization routines depicted in FIGS. 3 and 4 has been described for correlating lightning events detected by two lightning detectors and for synchronizing those two detectors, each synchronization routine may be repeatedly applied to other lightning detectors so as to synchronize all of the detectors in a given lightning location system together. Preferably, one of the detectors is designated as a master and the position analyzer attempts to synchronize as many other lightning detectors to that master detector as possible prior to designating a new master to which other detectors are then synchronized to. The position analyzer 16 is a multi-tasking system which attempts to synchronize and resynchronize the detectors of the system continuously when it has nothing else to do. The synchronization routine will further be run periodically even if the position analyzer 16 is running other tasks.

In the event that lightning occurs at a very low rate such that the time interval between lightning events detected by two detectors is on the order of hours or days, the position analyzer can further synchronize the two detectors using the times of occurrence identified by the two detectors for a single lightning event. As can happen in certain parts of the country, a single lightning flash may occur only once every several hours or days. When two detectors have not detected a lightning event in over a certain period of time on the order of hours or even days, the position analyzer responds to the detection of a single lightning event by the detectors by calculating the difference between the times of occurrence identified by the detectors for that lightning event. The calculated difference is then used to form the time correction factor to synchronize the detectors. It is noted that the time of arrivals at the position analyzer of the data representing the lightning event must be within a given window to prevent the correlation of time of occurrence data for lightning events which could not be the same.

Figure 5:
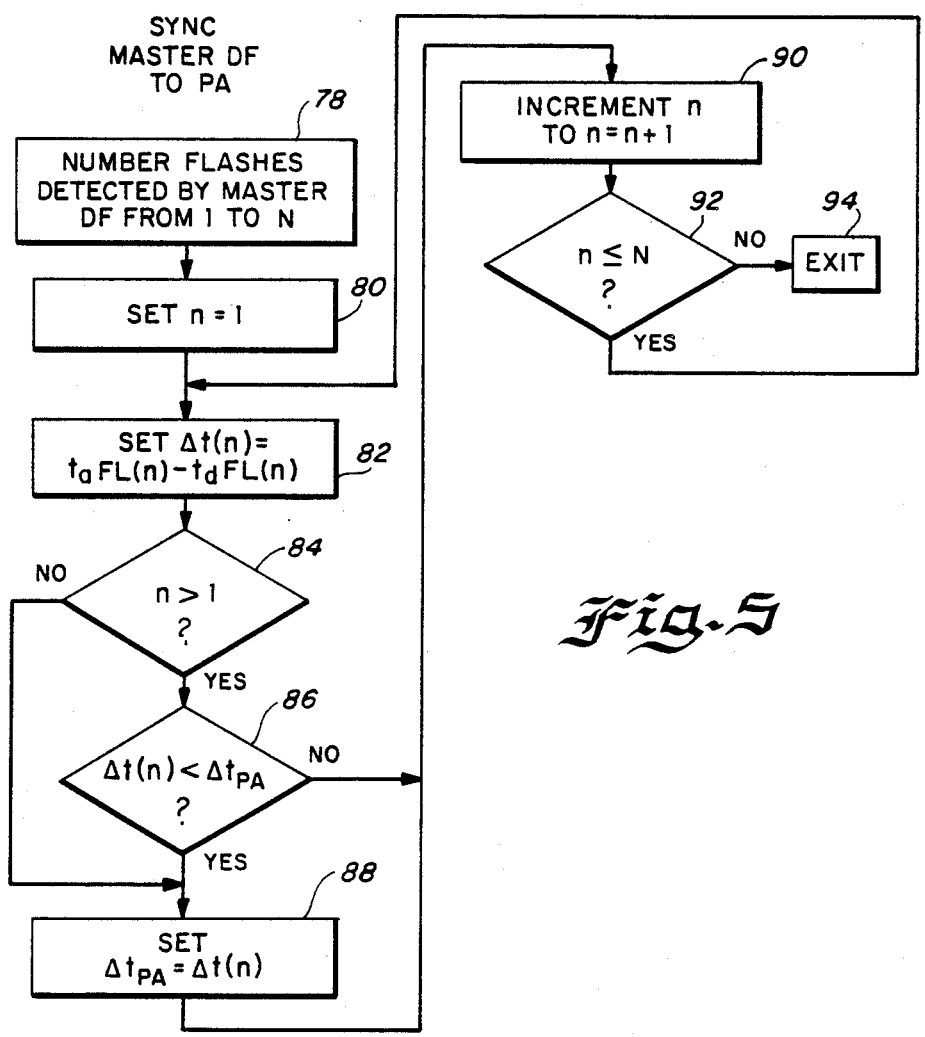
FIG. 5 is a flow chart illustrating the software for synchronizing a lightning detector to the position analyzer at the central site.

In order to synch the detectors 10-13 to the position analyzer 16 so that the time of occurrence of each lightning event might be reported in absolute time, the position analyzer 16 operates according to the routine illustrated in FIG. 5. Briefly, the microprocessor 18 operates according to the routine of FIG. 5 to synchronize a master lightning detector to the position analyzer by determining the minimum difference between the time of occurrence of a lightning event detected by the master detector and the time of arrival at the central office 14 of the data from the master detector corresponding to that lightning event to form a time correction factor. More specifically, at block 78, the processor 18 numbers the flashes detected by the master lightning detector from 1 to N and at block 80 sets n=1. At block 82, the processor sets $\Delta t(n)$=the difference between the time of arrival of the nth lightning event, $t_aFL(n)$, and the time of occurrence of the nth lightning event, $t_DFL(n)$. If n is greater than 1 as determined by the processor at block 84, at block 86, the processor determines whether $\Delta t(n)$ is less than the last set value of the variable $\Delta t_{PA}$ and if it is, at block 88 the processor sets $\Delta t_{PA}=\Delta t(n)$. Thereafter, at block 90 the processor increments n by one and at block 92 determines whether n is less than to equal to N. If n is less than or equal to N the processor returns to block 82 to compare the time of arrival and the time of occurrence of the next lightning event and if n is greater than N the processor exits at block 94.

It is seen with reference to FIG. 2, if the DF1 clock is the clock of the master lightning detector the first value of $\Delta t_{PA}$ will be set equal to 7−2 or 5. When the second lightning discharge occurs however, the difference between the time of arrival as measured on the position analyzer clock and the time of occurrence as measured by the lightning detector's clock will be 11−7 or 4 so that at block 88 $\Delta t_{PA}$ will be set equal to 4 and added to the times of occurrence of each event detected by the master clock and those synchronized thereto. It is noted that although in the preferred embodiment the position analyzer clock is an absolute time clock so that the time of occurrence of a lightning event can be provided in absolute time, any of the detectors' clocks could also be an absolute time clock. It is further noted, that in addition to adding the correction factors $\Delta t_{DF}$ and $\Delta t_{PA}$ to the time of occurrence data at the position analyzer to synchronize the detectors and position analyzer at the position analyzer 16, preferably, the correction factors are also transmitted back to the detectors to adjust their clocks so that the detector clocks are periodically synchronized.

The synchronization system and method described with reference to FIGS. 3-5 allows the detectors 10-13 to be synchronized to within 1 millisecond. The system may further synchronize the detectors on a microsecond level by accounting for the propagation delay; that is the time it takes for a detector to observe or sense the fields associated with a lightning discharge. To synch the detectors on a microsecond level the system and the method of the present invention calculate the location of a lightning discharge from the azimuth information from two detectors utilizing triangulation techniques or from the relative amplitudes of the fields detected by two detectors as disclosed in U.S. Pat. No. 4,425,190. After the location of the lightning is determined, the microprocessor 18 determines the distance of the lightning dividing discharge from a detector. Thereafter, by the distance information by the speed of light, a propagation delay may be calculated and used to further correct the timing information provided by the detector. The system and method of synchronizing according to the present invention allows the components of the system to be synchronized down to the microsecond level. The system and method of the present invention further is not only cost effective but also allows the lightning location system to employ cheaper forms of communication than has heretofore been possible.

Obviously, many modifications and variations of the present invention are possible in light of the above teachings. Thus, it is to be understood that within the scope of the appended claims, the invention may be practiced otherwise than as specifically described above.

We claim:

1. A system utilizing detected lightning as a reference for synchronizing two or more remote clocks comprising:
   first lightning detecting means for detecting the occurrence of a plurality of lightning events, said detecting means identifying the time of occurrence of said lighting events according to a first clock;
   second lightning detecting means for detecting the occurrence of said plurality of lightning events, said detecting means identifying the time of occurrence of said lightning event according to a second clock;
   means responsive to the times of occurrences of said plurality of lightning events detected by the first detecting means and to the times of occurrence of said plurality of lightning events detected by the second detecting means for correlating lightning events detected by the first detecting means with lightning events detected by the second detecting means based on the time intervals between lightning events detected by the first detecting means and the time intervals between lightning events detected by the second detecting means; and
   means responsive to said correlating means for calculating a correction factor used to synchronize said first and second clocks.

2. The system of claim 1, wherein said correlating means includes an absolute clock and means for assigning an absolute time to each of said correlated events.

3. The system of claim 1, wherein one of said clocks is an absolute time clock.

4. The system of claim 1, further including means responsive to said correlating means for adjusting said second clock to operate in synchronism with said first clock.

5. The system of claim 1, wherein said first and second detecting means includes means for detecting the first stroke in a cloud to ground flash and said correlating means compares the time intervals between flashes based on the time of occurrence of the first stroke in each flash.

6. The system of claim 1, wherein said first and second detecting means includes means for detecting multiple strokes in a cloud to ground flash and said correlating means compares the time intervals between a pair of strokes associated with one flash.

7. A synchronization system for a lightning detection system comprising:
   first and second lightning detecting means, each for detecting the occurrence of a plurality of lightning events, each detecting means having an associated clock for identifying the time of occurrence of each lightning event;
   means responsive to each of said detecting means for correlating lightning events detected by said first and second detecting means by comparing the time intervals between lightning events detected by said first detecting means with the time intervals between lightning events detected by said second detecting means; and
   means responsive to said correlating means for calculating a correction factor used to synchronize said first and second detecting means.

8. The system of claim 7, further including means for providing a correction factor to modify the times of occurrence measured by one of said clocks, said correction factor including the difference between the time of occurrence of a lightning event detected by said first detecting means and the time of occurrence of a correlated lightning event detected by said second detecting means.

9. The system of claim 7, wherein said correlating means includes an absolute time clock and means for assigning an absolute time to the time of occurrence of each of said correlated events.

10. The system of claim 7, wherein one of said clocks is an absolute time clock.

11. The system of claim 7, wherein said first and second detecting means include means for detecting a first stroke in a cloud to ground flash and said correlating means compares the time intervals between flashes based on the times of occurrence of the first stroke in each flash.

12. The system of claim 7, wherein said first and second detecting means include means for detecting multiple strokes in a cloud to ground flash and said correlating means compares the time intervals between a pair of strokes associated with one flash.

13. A lightning detection system comprising:
   first and second lightning detecting means, each for detecting the occurrence of a common lightning event, each detecting means having an associated clock for identifying the time of occurrence of said lightning event;
   means responsive to each of said detecting means for synchronizing the times of occurrence measured by the clocks associated with said first and second detecting means including:
   means for subtracting the time of occurrence identified by the clock of the second detecting means for a lightning event from the time of occurrence identified by the clock of the first detecting means for the same lightning event to provide a time difference; and
   means for adding the time difference to each time of occurrence of a lightning event detected by the second detecting means to synchronize the first detecting means to the second detecting means.

14. A lightning detecting system utilizing detected lightning as a reference comprising:
   a plurality of lightning detecting means, each for detecting the occurrence of a predetermined lightning event, each detecting means having an associated clock for identifying the time of occurrence of a detected lightning event and means for providing data representing said time of occurrence;
   means responsive to data from each of said lightning detecting means for determining the location of a lightning event detected by at least two of said detecting means, said location determining means including a clock for identifying the time of arrival of data at the location determining means from each of said lightning detecting means;
   means responsive to the times of occurrence of at least one lightning event detected by two of said detecting means, for synchronizing the clocks of said two detecting means; and means responsive to the time of arrival of data from one of said two detecting means and to the time of occurrence of one or more lightning events detected by said one detecting means for synchronizing the clocks of said two detecting means with the clock of said location determining means.

15. The lightning detecting system of claim 14, wherein said means for synchronizing the clocks of said two detecting means includes means for correlating lightning events detected by said first and second detecting means by comparing the time intervals between at least two lightning events detected by said first detecting means with the time intervals between at least two lightning events detected by said second detecting means.

16. The lightning detecting system of claim 14, wherein said means for synchronizing the clocks of said two detecting means includes means for subtracting the time of occurrence identified by the clock of a second detecting means for a lightning event from the time of occurrence identified by the clock of a first detecting means for the same lightning event to provide a time difference; and means for adding the time difference to each time of occurrence of a lightning event detected by the second detecting means to synchronize the first detecting means to the second detecting means.

17. The lightning detecting system of claim 14, wherein said means for synchronizing the clocks of the two detecting means with the location determining means includes means for determining the minimum difference between the time of occurrence and the time of arrival of a lightning event to form a time correction factor.

18. The lightning detection system of claim 14, wherein one of said clocks is an absolute time clock.

19. The lightning detection system of claim 14, wherein said first and second detecting means include means for detecting a first stroke in a cloud to ground flash and said correlating means compares the time intervals between flashes based on the time of occurrence of the first stroke in each flash.

20. The lightning detection system of claim 14, wherein said first and second detecting means includes means for detecting multiple strokes in a cloud to ground flash and said correlating means compares the time intervals between a pair of strokes associated with one flash.

21. The lightning detection system of claim 14 further including means responsive to the location of a lightning event for calculating a propagation time delay factor to correct the time of occurrence of a lightning event to account for the propagation delay.

22. A system utilizing detected lightning as a reference for synchronizing two remote clocks comprising:
first lightning detecting means for detecting the occurrence of a predetermined lightning event, said detecting means identifying the time of occurrence of said lightning event according to a first clock;
second lightning detecting means for detecting the occurrence of lightning event, said detecting means identifying the time of occurrence of said lightning event according to a second clock; and
means responsive to the times of occurrence of at least one lightning event detected by the first and second detecting means for synchronizing said first and second clocks.

23. A method of synchronizing first and second lightning detecting means each for detecting the occurrence of a predetermined lightning event and each detecting means including a clock for identifying the time of occurrence of a detected lightning event comprising:
calculating the time difference between each pair of lightning events detected by said first detecting means;
calculating the time difference between each pair of lightning events detected by said second detecting means;
correlating lightning events detected by said first detecting means with the lightning events detected by the second detecting means to determine corresponding lightning events detected by said first and second detecting means based upon the calculated time difference between lightning events detected by said first and second detecting means; and
calculating the difference between the time of occurrence of a lightning event detected by the first detecting means and the time of occurrence of the corresponding lightning event detected by the second detecting means to provide a correction factor, said correction factor being used for synchronizing said first and second detecting means.

24. A method of synchronizing a plurality of lightning detecting means each for detecting the occurrence of a predetermined lightning event and a lightning location determining means in communication with and responsive to each of said detecting means for determining the location of a lightning event detected by at least two detecting means, each of said detecting means and said location determining means including a clock, the clocks of the detecting means identifying the time of occurrence of lightning events detected by said detecting means and the clock of the location determining means identifying the time of arrival of data representing a lightning event at the location determining means for each of said detecting means comprising:
correlating lightning events detected by a first one of said detecting means with lightning events detected by a second one of said detecting means by comparing the time interval between two lightning events detected by the first detecting means with the time interval between two lightning events detected by the second detecting means to thereby identify corresponding lightning events detected by said first and second detecting means when said time intervals between said lightning events are substantially equal;
calculating a first time correction factor to be applied to one of said detectors to synchronize the detectors, said first time correction factor being determined by the difference between the time of occurrence of a lightning event detected by the first detecting means and the time of occurrence of the corresponding lightning event detected by the second detecting means; and
calculating a second time correction factor to be applied to said detectors to synchronize the detectors with said location determining means, said second time correction factor being determined by the minimum difference between the time of occurrence of a lightning event detected by one of said synchronized detectors and the time of arrival of data representing said lightning event at the location determining means.

25. The method of claim 24 further including the step of calculating a propagation time delay factor from the location of a lightning event to correct the time of occurrence of a lightning event to account for the propagation delay.

* * * * *